United States Patent
Chow et al.

(10) Patent No.: US 10,995,189 B2
(45) Date of Patent: May 4, 2021

(54) RESIN COMPOSITION AND APPLICATIONS THEREOF

(71) Applicant: KURARAY CO., LTD., Kurashiki (JP)

(72) Inventors: Edgard Chow, Houston, TX (US); Kentaro Yoshida, Kurashiki (JP); Tatsuya Hasegawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 139 days.

(21) Appl. No.: 16/332,586

(22) PCT Filed: Sep. 13, 2017

(86) PCT No.: PCT/JP2017/033016
§ 371 (c)(1),
(2) Date: Mar. 12, 2019

(87) PCT Pub. No.: WO2018/052014
PCT Pub. Date: Mar. 22, 2018

(65) Prior Publication Data
US 2020/0291197 A1    Sep. 17, 2020

Related U.S. Application Data

(60) Provisional application No. 62/393,860, filed on Sep. 13, 2016.

(51) Int. Cl.
| | |
|---|---|
| C08K 5/13 | (2006.01) |
| C08K 5/3435 | (2006.01) |
| C08J 5/18 | (2006.01) |
| C08J 3/22 | (2006.01) |
| A01G 13/02 | (2006.01) |
| A01F 25/13 | (2006.01) |
| A01F 25/14 | (2006.01) |
| F16L 9/12 | (2006.01) |
| A01G 9/14 | (2006.01) |
| A01M 13/00 | (2006.01) |
| E02D 17/20 | (2006.01) |
| E02D 31/00 | (2006.01) |

(52) U.S. Cl.
CPC ............... *C08J 5/18* (2013.01); *A01F 25/13* (2013.01); *A01F 25/14* (2013.01); *A01G 9/1407* (2013.01); *A01G 13/0275* (2013.01); *A01M 13/003* (2013.01); *C08J 3/22* (2013.01); *C08K 5/13* (2013.01); *C08K 5/3435* (2013.01); *E02D 17/202* (2013.01); *E02D 31/004* (2013.01); *F16L 9/12* (2013.01); *C08J 2329/04* (2013.01); *E02D 2300/0004* (2013.01)

(58) Field of Classification Search
None
See application file for complete search history.

(56) References Cited

U.S. PATENT DOCUMENTS

| | | | |
|---|---|---|---|
| 5,032,632 A | 7/1991 | Saxton | |
| 5,338,853 A | 8/1994 | MacLeay et al. | |
| 6,329,465 B1 * | 12/2001 | Takahashi | C08L 23/0815 |
| | | | 525/191 |
| 8,227,543 B2 * | 7/2012 | Bizet | C08G 81/028 |
| | | | 525/57 |
| 8,470,922 B2 * | 6/2013 | Jacob | C08L 23/0861 |
| | | | 524/503 |
| 9,290,636 B2 * | 3/2016 | Kazeto | B29C 48/09 |
| 2007/0071966 A1 * | 3/2007 | Mussig | C09J 7/243 |
| | | | 428/340 |
| 2013/0018133 A1 * | 1/2013 | Yamasaki | C08K 5/09 |
| | | | 524/140 |
| 2013/0040087 A1 | 2/2013 | Kazeto et al. | |
| 2013/0040157 A1 | 2/2013 | Igarashi et al. | |
| 2013/0045353 A1 * | 2/2013 | Menage | B32B 27/32 |
| | | | 428/76 |
| 2013/0266380 A1 * | 10/2013 | Capron | F16L 1/24 |
| | | | 405/184.4 |
| 2016/0361740 A1 * | 12/2016 | Xing | B32B 27/32 |

FOREIGN PATENT DOCUMENTS

| | | |
|---|---|---|
| CN | 102744943 A | 10/2012 |
| EP | 1 413 599 A1 | 4/2004 |
| JP | 4-117361 A | 4/1992 |
| JP | 4-227744 A | 8/1992 |
| JP | 2000-263712 A | 9/2000 |
| JP | 2006-159784 A | 6/2006 |
| JP | 2006-289671 A | 10/2006 |
| JP | 2014-172928 A | 9/2014 |
| JP | 2015-27813 A | 2/2015 |
| JP | 2016-27161 A | 2/2016 |
| JP | 2016-148056 A | 8/2016 |
| WO | WO 2011/125736 A1 * | 10/2011 |

OTHER PUBLICATIONS

International Search Report dated Dec. 5, 2017 in PCT/JP2017/033016 filed on Sep. 13, 2017.
Extended European Search Report dated Apr. 1, 2020, in Patent Application No. 17850915.4, 5 pages.

* cited by examiner

*Primary Examiner* — Tae H Yoon
(74) *Attorney, Agent, or Firm* — Oblon, McClelland, Maier & Neustadt, L.L.P.

(57) ABSTRACT

A resin composition contains an ethylene-vinyl alcohol copolymer (A) in which an ethylene unit content is from 10 to 60 mol %, a hindered amine-based compound (B) having a 2,2,6,6-tetraalkylpiperidine ring structure and having an alkoxy group bonded to a nitrogen atom in the structure, and a hindered phenol-based compound (C) having an ester bond or an amide bond. The resin composition contains 0.1 to 5 parts by mass of the hindered amine-based compound (B) and 0.2 to 5 parts by mass of the hindered phenol-based compound (C) with respect to 100 parts by mass of the ethylene-vinyl alcohol copolymer (A), and a mass ratio (C)/(B) is from 0.2 to 3.6.

13 Claims, No Drawings

RESIN COMPOSITION AND APPLICATIONS THEREOF

CROSS REFERENCE TO RELATED APPLICATIONS

The present application is a 371 national stage application of International Application PCT/JP2017/033016, filed Sep. 13, 2017, which claims priority to U.S. provisional patent application 62/393,860, filed Sep. 13, 2016.

TECHNICAL FIELD

The present invention relates to an ethylene-vinyl alcohol copolymer resin composition and applications thereof and specifically to an ethylene-vinyl alcohol copolymer resin composition excellent in weatherability and mechanical strength and applications thereof. More specifically, the present invention relates to an agricultural film, a grain storage bag, a geomembrane, and a pipe which are used outdoors for a long period of time.

BACKGROUND ART

In general, an ethylene-vinyl alcohol copolymer is excellent in transparency, gas barrier properties, aroma retention, solvent resistance, and oil resistance. By making use of such characteristics, the ethylene-vinyl alcohol copolymer is used as being molded into a film or a sheet for a food packaging material, a pharmaceutical packaging material, a heavy chemical packaging material, or an agricultural pesticide packaging material, or a container such as a bottle. On the other hand, by making use of barrier properties, thermal insulation, and resistance against contamination, the ethylene-vinyl alcohol copolymer is often used also for such applications as an agricultural film, a hot water circulation pipe, and a fuel pipe. In such applications as an agricultural film, a hot water circulation pipe, and a fuel pipe, however, the ethylene-vinyl alcohol copolymer is often exposed for a long period of time to ultraviolet rays (sunlight) or chemicals such as an agricultural pesticide, and lowering in physical properties (mechanical strength, gas barrier properties, and antifogging properties) of the ethylene-vinyl alcohol copolymer due to light and chemicals is a concern. In order to suppress such lowering in physical properties, an attempt to blend a hindered amine-based compound having a specific structure into a polyolefin resin composition or an ethylene-vinyl alcohol copolymer resin composition has been made. For example, PTL 1 describes blending a hindered amine-based compound having a specific structure into a polyolefin resin composition and PTL 2 describes blending a hindered amine-based compound having a specific structure into an ethylene-vinyl alcohol copolymer resin composition.

CITATION LIST

Patent Literature

PTL 1: Japanese Patent Laying-Open No. 2006-159784
PTL 2: Japanese Patent Laying-Open No. 2014-172928

SUMMARY OF INVENTION

Technical Problem

Blending a hindered amine-based compound having a specific structure or the like into an ethylene-vinyl alcohol copolymer resin at a high concentration for maintaining weatherability, however, has led to tendency of discoloration of the ethylene-vinyl alcohol copolymer resin composition. Blending a hindered phenol-based compound having a specific structure or the like into an ethylene-vinyl alcohol copolymer resin at a high concentration for improving heat stability has led to tendency of production of aggregates in an ethylene-vinyl alcohol copolymer composition. Furthermore, when an ethylene-vinyl alcohol copolymer resin composition containing such a compound is manufactured through a high-concentration blend (which may be abbreviated below as a "master batch"), stability in extrusion from an extruder has been disadvantageous and manufacturing has disadvantageously been unstable. The present invention was made to solve the problems above, and an object thereof is to provide an ethylene-vinyl alcohol copolymer resin composition which sufficiently exhibits an effect of a hindered amine-based compound and a hindered phenol-based compound blended therein and is excellent also in moldability, a master batch, a method of manufacturing the resin composition, and an agricultural film, a grain storage bag, a geomembrane, and a pipe which contain the resin composition.

Solution to Problem

The present invention provides a resin composition, a master batch, a method of manufacturing the resin composition, an agricultural film, a grain storage bag, a geomembrane, and a pipe shown below.

[1] A resin composition containing:
an ethylene-vinyl alcohol copolymer (A) in which an ethylene unit content is from 10 to 60 mol %;
a hindered amine-based compound (B) having a 2,2,6,6-tetraalkylpiperidine ring structure and having an alkoxy group bonded to a nitrogen atom in the structure; and
a hindered phenol-based compound (C) having an ester bond or an amide bond,
the resin composition containing 0.1 to 5 parts by mass of the hindered amine-based compound (B) and 0.2 to 5 parts by mass of the hindered phenol-based compound (C) with respect to 100 parts by mass of the ethylene-vinyl alcohol copolymer (A), and
a mass ratio (C)/(B) being from 0.2 to 3.6.

[2] The resin composition in [1], in which the hindered amine-based compound (B) has a molecular weight not smaller than 1000.

[3] The resin composition in [1] or [2], in which the hindered phenol-based compound (C) has an amide bond.

[4] An agricultural film having a gas barrier layer composed of the resin composition in any one of [1] to [3].

[5] The agricultural film in [4], the film being a soil fumigation film, a silage film, or a greenhouse film.

[6] A grain storage bag having a gas barrier layer composed of the resin composition in any one of [1] to [3].

[7] A geomembrane having a gas barrier layer composed of the resin composition in any one of [1] to [3].

[8] A pipe having a gas barrier layer composed of the resin composition in any one of [1] to [3].

[9] The pipe in [8], the pipe being a hot water circulation pipe or a fuel pipe.

[10] A master batch containing:
an ethylene-vinyl alcohol copolymer (A) in which an ethylene unit content is from 10 to 60 mol %;
a hindered amine-based compound (B) having a 2,2,6,6-tetraalkylpiperidine ring structure and having an alkoxy group bonded to a nitrogen atom in the structure; and a hindered phenol-based compound (C) having an ester bond or an amide bond, the master batch containing 2 to 20 parts by mass of the hindered amine-based compound (B) and 1 to 14 parts by mass of the hindered phenol-based compound (C) with respect to 100 parts by mass of the ethylene-vinyl alcohol copolymer (A), and a mass ratio (C)/(B) being from 0.2 to 3.6.

[11] A method of manufacturing a resin composition including: obtaining a master batch by melting and kneading in advance 100 parts by mass of an ethylene-vinyl alcohol copolymer (A) in which an ethylene unit content is from 10 to 60 mol %, 2 to 20 parts by mass of a hindered amine-based compound (B) having a 2,2,6,6-tetraalkylpiperidine ring structure and having an alkoxy group bonded to a nitrogen atom in the structure, and 1 to 14 parts by mass of a hindered phenol-based compound (C) having an ester bond or an amide bond; and melting and kneading the obtained master batch and additional ethylene-vinyl alcohol copolymer (A).

ADVANTAGEOUS EFFECTS OF INVENTION

The resin composition according to the present invention can achieve suppression of discoloration of a resin and production of aggregates and is excellent in weatherability and manufacturing stability. Use of the master batch according to the present invention leads to higher manufacturing stability in making a film. According to the manufacturing method in the present invention, the resin composition can be manufactured.

DESCRIPTION OF EMBODIMENTS

Resin Composition

A resin composition according to the present invention contains 100 parts by mass of an ethylene-vinyl alcohol copolymer (A) in which an ethylene unit content is from 10 to 60 mol % (which may be abbreviated below as "EVOH (A)"), a hindered amine-based compound (B) having a 2,2,6,6-tetraalkylpiperidine ring structure and having an alkoxy group bonded to a nitrogen atom in the structure (which may be abbreviated below as a "hindered amine-based compound (B)"), and a hindered phenol-based compound (C) having an ester bond or an amide bond (which may be abbreviated below as a "hindered phenol-based compound (C)"). The resin composition contains 0.1 to 5 parts by mass of the hindered amine-based compound (B) and 0.2 to 5 parts by mass of the hindered phenol-based compound (C) with respect to 100 parts by mass of EVOH (A). A mass ratio (C)/(B) is from 0.2 to 3.6. By containing the hindered amine-based compound (B) and the hindered phenol-based compound (C) together at a certain ratio, a problem derived from the hindered amine-based compound (B) (discoloration) and a problem derived from the hindered phenol-based compound (C) (production of aggregates) are overcome and high weatherability and manufacturing stability can be achieved.

EVOH (A)

EVOH (A) is a copolymer having an ethylene unit and a vinyl alcohol unit, and it is a copolymer in which an ethylene unit content is from 10 to 60 mol %. EVOH (A) is obtained, for example, by saponifying a copolymer containing ethylene and vinyl ester by using an alkaline catalyst. Though vinyl acetate is a representative example of vinyl esters, other fatty acid vinyl esters (vinyl formate, vinyl propionate, vinyl valerate, vinyl caprate, vinyl laurate, vinyl stearate, vinyl benzoate, vinyl pivalate, and vinyl versatate) can also be used.

The lower limit of the ethylene unit content of EVOH (A) is set to 10 mol %, preferably to 20 mol %, more preferably to 25 mol %, and further preferably to 27 mol %. The upper limit of the ethylene unit content of EVOH (A) is set to 60 mol %, preferably to 55 mol %, and more preferably to 50 mol %. The ethylene unit content lower than the lower limit may lead to lowering in melt moldability of the resin composition. In contrast, the ethylene unit content exceeding the upper limit may lead to lowering in gas barrier properties of an agricultural film, a grain storage bag, a geomembrane, or a pipe that is obtained.

The lower limit of a degree of saponification of EVOH (A) is set preferably to 90 mol %, more preferably to 95 mol %, and further preferably to 99 mol %. The degree of saponification of EVOH (A) not lower than the lower limit is preferred from a point of view of maintaining gas barrier properties of an agricultural film, a grain storage bag, a geomembrane, or a pipe that is obtained. The upper limit of the degree of saponification may be set to 99.94 mol % or 99.97 mol %.

EVOH (A) may contain a unit derived from a monomer other than ethylene and vinyl ester and a saponified product thereof so long as the object of the present invention is not interfered. When EVOH (A) contains a unit derived from other monomers, a content thereof with respect to all structural units in EVOH (A) is preferably not higher than 10 mol %, more preferably not higher than 5 mol %, and further preferably not higher than 3 mol %. When EVOH (A) contains a unit derived from other monomers, a lower limit value thereof may be set to 0.05 mol %. Examples of other monomers include unsaturated acid such as acrylic acid, methacrylic acid, crotonic acid, or itaconic acid, or anhydride, salt, or mono- or di-alkyl ester thereof, nitrile such as acrylonitrile or methacrylonitrile; amide such as acrylamide or methacrylamide; olefin sulfonate such as vinyl sulfonic acid, allylsulfonic acid, or methallylsulfonic acid, or salt thereof; a vinyl silane compound such as vinyltrimethoxysilane, vinyltriethoxysilane, vinyl tris(β-methoxy-ethoxy) silane, or γ-methacryloxypropyl methoxysilane; alkyl vinyl ethers, vinyl ketone, N-vinylpyrrolidone, vinyl chloride, and vinylidene chloride.

EVOH (A) may contain at least any one of a structural unit (I) expressed in a formula (I) below, a structural unit (II) expressed in a formula (II) below, and a structural unit (III) expressed in a general formula (III) below so long as the object of the present invention is not interfered. With EVOH (A) containing such a structural unit, resistance against bending or the like of a molding and a multi-layered structure that are obtained can further be enhanced.

-continued

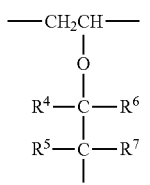
(II)

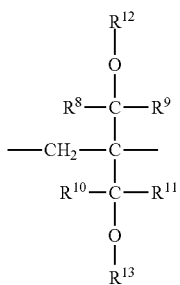
(III)

In the formula (I), $R^1$, $R^2$, and $R^3$ each independently represent a hydrogen atom, an aliphatic hydrocarbon group having a carbon number from 1 to 10, an alicyclic hydrocarbon group having a carbon number from 3 to 10, an aromatic hydrocarbon group having a carbon number from 6 to 10, or a hydroxyl group. Any two of $R^1$, $R^2$, and $R^3$ may be bonded as a pair. At least one or all of hydrogen atoms in the aliphatic hydrocarbon group having a carbon number from 1 to 10, the alicyclic hydrocarbon group having a carbon number from 3 to 10, and the aromatic hydrocarbon group having a carbon number from 6 to 10 may be substituted with a hydroxyl group, a carboxy group, or a halogen atom.

In the formula (II), $R^4$, $R^5$, $R^6$, and $R^7$ each independently represent a hydrogen atom, an aliphatic hydrocarbon group having a carbon number from 1 to 10, an alicyclic hydrocarbon group having a carbon number from 3 to 10, an aromatic hydrocarbon group having a carbon number from 6 to 10, or a hydroxyl group. $R^4$ and $R^5$ may be bonded to each other or $R^6$ and $R^7$ may be bonded to each other. At least one or all of hydrogen atoms in the aliphatic hydrocarbon group having a carbon number from 1 to 10, the alicyclic hydrocarbon group having a carbon number from 3 to 10, and the aromatic hydrocarbon group having a carbon number from 6 to 10 may be substituted with a hydroxyl group, an alkoxy group, a carboxy group, or a halogen atom.

In the general formula (III), $R^8$, $R^9$, $R^{10}$, and $R^{11}$ each independently represent a hydrogen atom, an aliphatic hydrocarbon group having a carbon number from 1 to 10, an alicyclic hydrocarbon group having a carbon number from 3 to 10, an aromatic hydrocarbon group having a carbon number from 6 to 10, or a hydroxyl group. At least one or all of hydrogen atoms in the aliphatic hydrocarbon group having a carbon number from 1 to 10, the alicyclic hydrocarbon group having a carbon number from 3 to 10, and the aromatic hydrocarbon group having a carbon number from 6 to 10 may be substituted with a hydroxyl group, an alkoxy group, a carboxy group, or a halogen atom. $R^{12}$ and $R^{13}$ each independently represent a hydrogen atom, a formyl group, or an alkanoyl group having a carbon number from 2 to 10.

When EVOH (A) contains the structural unit (I), (II), or (III), the lower limit of a content thereof is set preferably to 0.5 mol %, more preferably to 1 mol %, and further preferably to 1.5 mol %. When EVOH (A) contains the structural unit (I), (II), or (III), the upper limit of the content thereof is set preferably to 30 mol %, more preferably to 15 mol %, and further preferably to 10 mol %. When EVOH (A) contains the structural unit shown in (I), (II), or (III) at a ratio within that range, flexibility and processability of the resin composition are improved, and consequently stretchability and heat moldability of an agricultural film, a grain storage bag, a geomembrane, or a pipe that is obtained can be improved.

In the structural unit (I), (II), or (III), examples of the aliphatic hydrocarbon group having a carbon number from 1 to 10 include an alkyl group and an alkenyl group, examples of the alicyclic hydrocarbon group having a carbon number from 3 to 10 include a cycloalkyl group and a cycloalkenyl group, and examples of the aromatic hydrocarbon group having a carbon number from 6 to 10 include a phenyl group.

In the structural unit (I), $R^1$, $R^2$, and $R^3$ are each preferably independently a hydrogen atom, a methyl group, an ethyl group, a hydroxyl group, a hydroxymethyl group, and a hydroxyethyl group, and among these, they are each further preferably independently a hydrogen atom, a methyl group, a hydroxyl group, and a hydroxymethyl group. With such $R^1$, $R^2$, and $R^3$, stretchability and heat moldability of an agricultural film, a grain storage bag, a geomembrane, or a pipe that is obtained can further be improved.

Though a method of containing the structural unit (I) in EVOH (A) is not particularly limited, examples of the method include a method of copolymerizing a monomer from which the structural unit (I) is derived in polymerization between ethylene and vinyl ester. Examples of monomers from which the structural unit (I) is derived include alkene such as propylene, butylene, pentene, and hexene; and alkene having a hydroxyl group or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene, and 5,6-diacyloxy-1-hexene. Among these, from a point of view of copolymerization reactivity and gas barrier properties of an agricultural film, a grain storage bag, a geomembrane, or a pipe that is obtained, propylene, 3-acyloxy-1-propene, 3-acyloxy-1-butene, 4-acyloxy-1-butene, and 3,4-diacyloxy-1-butene are preferred. Acyloxy is preferably acetoxy, and specifically, 3-acetoxy-1-propene, 3-acetoxy-1-butene, 4-acetoxy-1-butene, and 3,4-diacetoxy-1-butene are preferred. In an example of alkene having ester, the structural unit (I) is derived therefrom in saponification reaction.

In the structural unit (II), $R^4$ and $R^5$ are both preferably a hydrogen atom. In particular, more preferably, $R^4$ and $R^5$ are both a hydrogen atom, one of $R^6$ and $R^7$ is an aliphatic hydrocarbon group having a carbon number from 1 to 10 and the other is a hydrogen atom. An alkyl group and an alkenyl group are preferred as the aliphatic hydrocarbon group. From a point of view of particular importance on gas barrier properties of an agricultural film, a grain storage bag, a geomembrane, or a pipe that is obtained, particularly preferably, one of $R^6$ and $R^7$ is a methyl group or an ethyl group and the other thereof is a hydrogen atom. It is also particularly preferred that one of $R^6$ and $R^7$ is a substituent expressed as $(CH_2)_hOH$ (h being an integer from 1 to 8) and the other thereof is a hydrogen atom. In the substituent expressed as $(CH_2)_hOH$, h is preferably an integer from 1 to 4, more preferably 1 or 2, and particularly preferably 1.

Though a method of containing the structural unit (II) in EVOH (A) is not particularly limited, a method of containing the structural unit (II) by having a univalent epoxy compound react with EVOH (A) obtained by saponification reaction is employed. Compounds expressed in formulae (IV) to (X) below are suitably employed as a univalent epoxy compound.

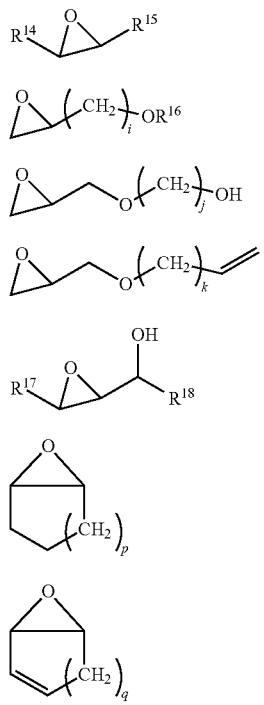

In the formulae (IV) to (X), $R^{14}$, $R^{15}$, $R^{16}$, $R^{17}$, and $R^{18}$ each independently represent a hydrogen atom, an aliphatic hydrocarbon group having a carbon number from 1 to 10 (an alkyl group, an alkenyl group, and the like), an alicyclic hydrocarbon group having a carbon number from 3 to 10 (a cycloalkyl group, a cycloalkenyl group, and the like), or an aromatic hydrocarbon group having a carbon number from 6 to 10 (a phenyl group and the like). i, j, k, p, and q each independently represent an integer from 1 to 8. When $R^{17}$ is a hydrogen atom, $R^{18}$ represents a substituent other than a hydrogen atom.

Examples of the univalent epoxy compound expressed in the formula (IV) include epoxyethane (ethylene oxide), epoxypropane, 1,2-epoxybutane, 2,3-epoxybutane, 3-methyl-1,2-epoxybutane, 1,2-epoxypentane, 3-methyl-1,2-epoxypentane, 1,2-epoxyhexane, 2,3-epoxyhexane, 3,4-epoxyhexane, 3-methyl-1,2-epoxyhexane, 3-methyl-1,2-epoxyheptane, 4-methyl-1,2-epoxyheptane, 1,2-epoxyoctane, 2,3-epoxyoctane, 1,2-epoxynonane, 2,3-epoxynonane, 1,2-epoxydecane, 1,2-epoxydodecane, epoxyethyl benzene, 1-phenyl-1,2-propane, and 3-phenyl-1,2-epoxypropane.

Examples of the univalent epoxy compound expressed in the formula (V) include various types of alkyl glycidyl ether.

Examples of the univalent epoxy compound expressed in the formula (VI) include various types of alkylene glycol monoglycidyl ether.

Examples of the univalent epoxy compound expressed in the formula (VII) include various types of alkenyl glycidyl ether.

Examples of the univalent epoxy compound expressed in the formula (VIII) include various types of epoxy alkanol such as glycidol.

Examples of the univalent epoxy compound expressed in the formula (IX) include various types of epoxycycloalkene.

Examples of the univalent epoxy compound expressed in the formula (X) include various types of epoxycycloalkene.

Among the univalent epoxy compounds, an epoxy compound having a carbon number from 2 to 8 is preferred. In particular, from a point of view of ease in handling and reactivity of a compound, the carbon number of the univalent epoxy compound is more preferably from 2 to 6 and further preferably from 2 to 4. The univalent epoxy compound is particularly preferably a compound expressed in the formula (IV) or the compound expressed in the formula (V) among the formulae. Specifically, from a point of view of reactivity with EVOH (A) and gas barrier properties of an agricultural film, a grain storage bag, a geomembrane, or a pipe that is obtained, 1,2-epoxybutane, 2,3-epoxybutane, epoxypropane, epoxyethane, or glycidol is preferred, and among these, epoxypropane or glycidol is particularly preferred.

In the structural unit (III), $R^8$, $R^9$, $R^{10}$, and $R^{11}$ are preferably a hydrogen atom or an aliphatic hydrocarbon group having a carbon number from 1 to 5, and the aliphatic hydrocarbon group is preferably a methyl group, an ethyl group, an n-propyl group, an isopropyl group, an n-butyl group, an isobutyl group, a tert-butyl group, or an n-pentyl group.

Though a method of containing the structural unit (III) in EVOH (A) is not particularly limited, examples of the method include a method described in Japanese Patent Laying-Open No. 2014-034647.

One type of EVOH (A) alone can be used or two or more types of EVOH (A) may be used together.

Hindered Amine-Based Compound (B)

The hindered amine-based compound (B) has a 2,2,6,6-tetraalkylpiperidine ring structure and has an alkoxy group bonded to a nitrogen atom in the structure. Examples of the hindered amine-based compound (B) include TINUVIN NOR 371 (which is manufactured by BASF Japan Ltd. and has a chemical formula name of 1-Cyclohexyloxy-2,2,6,6-tetramethyl-4-octadecylaminopiperidine, bis(1-Octyloxy-2,2,6,6-tetramethylpiperidin-4-yl)sebacate and a molecular weight from 2800 to 4000), Hostavin NOW (which is manufactured by Clariant and has a chemical formula shown as a formula (XI) below and a molecular weight of approximately 2000), and FLAMESTAB NOR 116 (which is manufactured by BASF Japan Ltd. and has a chemical formula shown as a formula (XII) below and a molecular weight of 2261), and in particular, TINUVIN NOR 371 is preferred. Such a hindered amine-based compound (B) may be used alone or two or more types thereof may be used together.

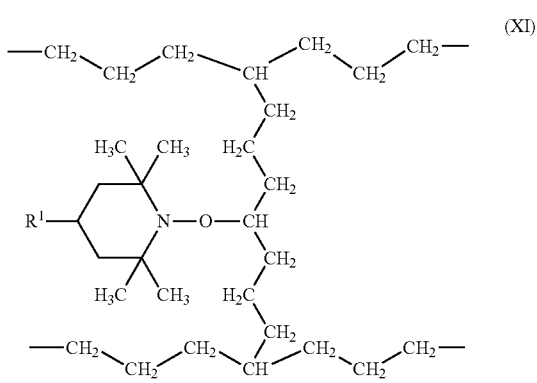

(XI)

(In the formula (XI), $R^1$ represents an alkyl group having a carbon number from 1 to 18 or an alkenyl group having a carbon number from 2 to 18.)

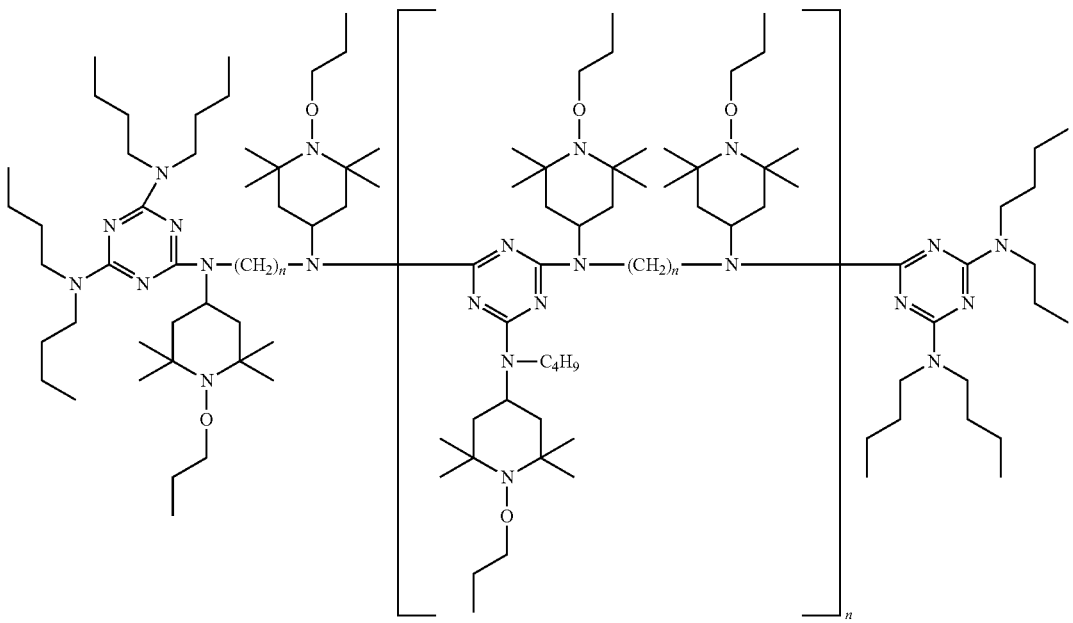

(XII)

A molecular weight of the hindered amine-based compound (B) is preferably not smaller than 1000. When the molecular weight is smaller than 1000, disadvantageously, the hindered amine-based compound (B) bleeds out or volatilizes during use for a long time and an effect of weatherability is lowered. When a resin composition containing the hindered amine-based compound (B) is used to manufacture a molding, the hindered amine-based compound (B) bleeds out and contaminates a mold of a molding machine. Therefore, appearance of a surface of the molding becomes poor and moldings with clean surfaces cannot successively be manufactured. The molecular weight of the hindered amine-based compound (B) is more preferably not smaller than 1400, further preferably not smaller than 1700, and particularly preferably not smaller than 1900. The molecular weight of the hindered amine-based compound (B) may be not greater than 5000.

A content of the hindered amine-based compound (B) in the resin composition according to the present invention is from 0.1 to 5 parts by mass with respect to 100 parts by mass of EVOH (A). A content of the hindered amine-based compound (B) is preferably not less than 0.2 part by mass and more preferably not less than 0.6 part by mass. When the content of the hindered amine-based compound (B) is less than 0.1 part by mass, sufficient weatherability cannot be obtained. When the content of the hindered amine-based compound (B) is more than 5 parts by mass, a film may significantly be colored after a weathering test, or a resin becomes soft during manufacturing and stable manufacturing cannot be performed. A content of the hindered amine-based compound (B) in the resin composition according to the present invention is preferably not more than 4 parts by mass, more preferably not more than 2.5 parts by mass, and further preferably not more than 2.0 parts by mass.

A method of containing the hindered amine-based compound (B) in the resin composition or the master batch according to the present invention is not particularly limited. Examples of the method include a method of dry-blending EVOH (A) and the hindered amine-based compound (B) and then melting and kneading them in an extruder, a method of immersing EVOH (A) in a solution in which the hindered amine-based compound (B) has been dissolved, a method of melting EVOH (A) and mixing the hindered amine-based compound (B) therein, and a method of melting and blending EVOH (A) and the hindered amine-based compound (B) in an extruder. Among these, the method of dry-blending EVOH (A) and the hindered amine-based compound (B) and further melting and kneading them in an extruder is preferred.

Hindered Phenol-Based Compound (C)

The hindered phenol-based compound (C) has an ester bond or an amide bond. Examples of such a hindered phenol-based compound (C) include Irganox 1010 (which is a trademark manufactured by BASF Japan Ltd. and has a chemical formula name of pentaerythritol tetrakis[3-(3,5-ditert-butyl-4-hydroxyphenyl)propionate] and a molecular weight of 1178), Irganox 1076 (which is a trademark manufactured by BASF Japan Ltd. and has a chemical formula name of octadecyl-3-(3,5-di-tert-butyl-4-hydroxyphenyl)-propionate and a molecular weight of 531), Cyanox 1790 (which is a trademark manufactured by Cyanamid and has a chemical formula name of 1,3,5-tris(4-tert-butyl-3-hydroxy-2,6-dimethylbenzyl)isocyanurate and a molecular weight of 699), and Irganox 1098 (which is a trademark manufactured by BASF Japan Ltd. and has a chemical formula name of N,N'-(hexane-1,6-diyl)bis[3-(3,5-di-tert-butyl-4-hydroxyphenyl)propionamide] and a molecular weight of 637). When the resin composition according to the present invention is used for an agricultural film, it may be exposed to an agricultural pesticide such as chloropicrin or dimethyl disulfide and the film may be used under an acid condition. When the film is used under the acid condition, the hindered phenol-based compound (C) preferably has an amide bond from a point of view of stability under the acid condition, and for example, Irganox 1098 having an amide bond is preferred.

A content of the hindered phenol-based compound (C) in the resin composition according to the present invention is from 0.2 to 5 parts by mass with respect to 100 parts by mass of EVOH (A). A content of the hindered phenol-based compound (C) is preferably not less than 0.3 part by mass and more preferably not less than 0.4 part by mass. When the content of the hindered phenol-based compound (C) is less than 0.2 part by mass, discoloration of a film after a weathering test is noticeable and a sufficient effect cannot be obtained. When the content of the hindered phenol-based compound (C) is more than 5 parts by mass, many aggregates are produced during manufacturing of films and satisfactory films cannot be obtained. The content of the hindered phenol-based compound (C) is preferably not more than 3 parts by mass, more preferably not more than 2 parts by mass, and further preferably not more than 1 part by mass.

A mass ratio (C)/(B) of the hindered phenol-based compound (C) to the hindered amine-based compound (B) in the resin composition according to the present invention is from 0.2 to 3.6. When (C)/(B) is lower than 0.2, discoloration of a film after a weathering test is noticeable and a sufficient effect cannot be obtained. (C)/(B) is preferably not lower than 0.3 and more preferably not lower than 0.4. When (C)/(B) is higher than 3.6, sufficient weatherability cannot be obtained. (C)/(B) is preferably not higher than 3, more preferably not higher than 1.9, further preferably not higher than 1.5, and particularly preferably not higher than 1.1.

The resin composition may contain an additive such as a heat stabilizer, an antioxidant, a plasticizer, a coloring agent, a filler, a thickener, or a resin other than the hindered amine-based compound (B) and the hindered phenol-based compound (C) so long as the effect of the present invention is not interfered. Though a method of containing such an additive in the resin composition is not particularly restricted, examples of the method include a method of melting the resin composition and mixing an additive therein, a method of melting and blending the resin composition and an additive in an extruder, and a method of mixing powders or pellets in a form of a granule, a sphere, or a columnar chip of the resin composition and a solid, a liquid, or a solution of an additive and impregnating the resin composition with the additive or spreading the additive over the resin composition. A method can be selected as appropriate in consideration of physical properties of an additive or permeability thereof to the resin composition.

Examples of the plasticizer include dimethyl phthalate, diethyl phthalate, dioctyl phthalate, wax, liquid paraffin, and phosphate.

Examples of the heat stabilizer include acid or polybasic acid such as phosphoric acid, pyrophosphoric acid, phosphorous acid, oxalic acid, succinic acid, adipic acid, tartaric acid, citric acid, sodium dihydrogen phosphate, potassium dihydrogen phosphate, and acetic acid, and salt thereof. Heat stability at the time of melt molding can be improved by adding the heat stabilizer to the resin composition. In impregnation of the resin composition with a solution of the heat stabilizer, a solvent used for preparing the solution of the heat stabilizer is not particularly restricted, however, water is preferred.

Examples of the coloring agent include carbon black, phthalocyanine, quinacridone, an isoindoline-based pigment, an azo-based pigment, and rouge.

Examples of the filler include glass fibers, wollastonite, calcium silicate, talc, and montmorillonite.

Master Batch

The master batch according to the present invention is obtained by melting and kneading EVOH (A), the hindered amine-based compound (B), and the hindered phenol-based compound (C) at a high concentration, and it is used as being diluted with EVOH (A) to a defined concentration at the time of molding into an agricultural film, a grain storage bag, a geomembrane, and a pipe according to the present invention. Specifically, the master batch contains EVOH (A), the hindered amine-based compound (B), and the hindered phenol-based compound (C), the master batch contains 2 to 20 parts by mass of hindered amine-based compound (B) and 1 to 14 parts by mass of hindered phenol-based compound (C) with respect to 100 parts by mass of EVOH (A), and a mass ratio (C)/(B) of the hindered phenol-based compound (C) to the hindered amine-based compound (B) is from 0.2 to 3.6. The content of the hindered amine-based compound (B) and the hindered phenol-based compound (C) within the range described above can lead to stable production of the master batch. Furthermore, an agricultural film, a grain storage bag, a geomembrane, and a pipe obtained by undergoing manufacturing of the master batch in which the mass ratio (C)/(B) of the hindered phenol-based compound (C) to the hindered amine-based compound (B) in the master batch is within the range have good weatherability. (C)/(B) is more preferably not lower than 0.3 and further preferably not lower than 0.4. (C)/(B) is more preferably not higher than 3, more preferably not higher than 1.9, further preferably not higher than 1.5, and particularly preferably not higher than 1.1. A total amount ((B)+(C)) of the hindered amine-based compound (B) and the hindered phenol-based compound (C) in the master batch according to the present invention is preferably not less than 7.5 parts by mass, more preferably not less than 9.0 parts by mass, further preferably not less than 10.0 parts by mass, and particularly preferably not less than 15.0 parts by mass with respect to 100 parts by mass of EVOH (A). (B)+(C) is preferably not more than 30.0 parts by mass and more preferably not more than 25.0 parts by mass with respect to 100 parts by mass of EVOH.

Manufacturing Method

The resin composition according to the present invention can be manufactured by a manufacturing method including a step of dry-blending EVOH (A), the hindered amine-based compound (B), and the hindered phenol-based compound (C) at the concentration described above and melting and kneading them or by a manufacturing method including a step of going through a master batch. Of these methods, the manufacturing method including the step of going through the master batch described previously is preferred, and manufacturing by a manufacturing method including a step of obtaining a master batch by melting and kneading in advance 100 parts by mass of EVOH (A), 2 to 20 parts by mass of the hindered amine-based compound (B), and 1 to 14 parts by mass of the hindered phenol-based compound (C) and melting and kneading the obtained master batch and additional EVOH (A) is preferred. By providing the step of obtaining a master batch in advance, as compared with other mixing methods, the hindered amine-based compound (B) and the hindered phenol-based compound (C) are well dispersed, uneven mixing at the time when a film or the like is made of the resin composition does not occur, and a film or the like free from variation in weatherability is obtained. EVOH (A) contained in a master batch may be identical to or different from EVOH (A) to be used in further melting and kneading with the master batch.

Uneven mixing at the time when a film or the like is made of the resin composition obtained by the manufacturing method including the step of going through a master batch can be evaluated based on an SD value (a standard deviation) of fracture strength and fracture elongation in a film tensile test. A smaller SD value indicates less uneven mixing. As uneven mixing is less, variation in weatherability in a film preferably becomes less. If weatherability is varied, a part of a film deteriorates earlier when the film is used outdoors for a long period of time or a soil fumigation agent may leak when the film is used as a soil fumigation film. The SD value is preferably not greater than 10 and further preferably not greater than 8. The SD value is greater than 0 and preferably not smaller than 1 from a point of view of manufacturing cost.

Application

The resin composition according to the present invention is excellent in weatherability and manufacturing stability, and it is suitable for: an agricultural film such as a soil fumigation film, a silage film, and a greenhouse film; a grain storage bag; a geomembrane; and a pipe such as a hot water circulation pipe or a fuel pipe each of which has a gas barrier layer composed of such a resin composition. The present invention also provides an agricultural film (preferably, a soil fumigation film, a silage film, or a greenhouse film), a grain storage bag, a geomembrane, and a pipe (preferably, a hot water circulation pipe or a fuel pipe) each of which has a gas barrier layer composed of such a resin composition according to the present invention.

The resin composition according to the present invention is particularly useful when it is used for a soil fumigation film for preventing evaporation of chloropicrin, methyl bromide, or the like used as a soil fumigation agent or a silage film which wraps silage exhibiting acidity as a result of fermentation. Under such a condition, the resin composition according to the present invention is exposed to an acid condition caused by an agent or silage. Deterioration of the film is accelerated as the film is used outdoors for a long period of time under the acid condition. Even under such a condition, however, the soil fumigation film or the silage film composed of the resin composition according to the present invention is excellent in weatherability.

EXAMPLES

Though the present invention will further be described below with reference to Examples, the present invention is not limited thereby.

Manufacturing Example 1: Preparation of Master Batch Pellet and Film

Master batch pellets were obtained by dry-blending 100 parts by mass of EVAL H171 (which was an ethylene-vinyl alcohol copolymer manufactured by Kuraray Co., Ltd. and had an ethylene unit content of 38 mol %, a melting point of 172° C., MFR (210° C., 2160 g load) of 3.4 g/10 minutes, and a degree of saponification of 99.8 mol % or higher), 0.64 part by mass of TINUVIN NOR 371 (which was a hindered amine-based compound manufactured by BASF Japan Ltd. and had an N-alkoxy-2,2,6,6-tetraalkylpiperidine structure), and 8.94 parts by mass of Irganox 1098 (which was N,N'-(hexane-1,6-diyl)bis[3-(3,5-di-tert-butyl-4-hydroxyphenyl)propionamide] manufactured by BASF Japan Ltd.), melting and kneading them under conditions below, and thereafter pelletizing them.

Extruder: twin screw extruder (Labo Plastomill manufactured by Toyo Seiki Seisaku-sho, Ltd.), 25 mm ϕ

The number of die holes: 2 holes (3 mm ϕ)

Set temperature: C1/C2/C3/C4/C5=175° C./225° C./225° C./220° C./220° C.

Screw rotation: 60 rpm

Manufacturing Examples 2 to 28

Master batch pellets were obtained as in Manufacturing Example 1 except for formulations as shown in Table 1.

Ethylene-Vinyl Alcohol Copolymer (A)

EVOH1: EVAL H171 (which was an ethylene-vinyl alcohol copolymer manufactured by Kuraray Co., Ltd. and had an ethylene unit content of 38 mol %, a melting point of 172° C., MFR (210° C., 2160 g load) of 3.4 g/10 minutes, and a degree of saponification of 99.8 mol % or higher)

EVOH2: EVAL L171 (which was an ethylene-vinyl alcohol copolymer manufactured by Kuraray Co., Ltd. and had an ethylene unit content of 27 mol %, a melting point of 191° C., MFR (210° C., 2160 g load) of 4.0 g/10 minutes, and a degree of saponification of 99.8 mol % or higher)

EVOH3: EVAL E171 (which was an ethylene-vinyl alcohol copolymer manufactured by Kuraray Co., Ltd. and had an ethylene unit content of 44 mol %, a melting point of 165° C., MFR (210° C., 2160 g load) of 3.3 g/10 minutes, and a degree of saponification of 99.8 mol % or higher)

Hindered Amine-Based Compound (B)

A1: TINUVIN NOR 371 (manufactured by BASF Japan Ltd.)

A2: Hostavin NOW (manufactured by Clariant)

A3: FLAMESTAB NOR 116 (manufactured by BASF Japan Ltd.)

Light Stabilizer Other Than Hindered Amine-Based Compound (B) According to the Present Invention A4: Chimassorb 2020 (which was manufactured by BASF Japan Ltd. and had a chemical formula name of a polycondensation of dibutylamine-1,3,5-triazine.N,N'-bis(2,2,6,6-tetramethyl-4-piperidyl)-1,6-hexamethylene diamine and N-(2,2,6,6-tetramethyl-4-piperidyl)butylamine)

Hindered Phenol-Based Compound (C)

B1: Irganox 1098 (manufactured by BASF Japan Ltd.)
B2: Irganox 1010 (manufactured by BASF Japan Ltd.)

Antioxidant Other Than Hindered Phenol-Based Compound (C) According to the Present Invention B3: Irgafos 168 (which was manufactured by BASF Japan Ltd. and had a chemical formula name of tris(2,4-di-tert-butylphenyl)phosphite)
B4: AO-412S (which was manufactured by ADEKA Corporation and had a chemical formula name of pentaerythritoltetrakis(3-laurylthiopropionate))

B5: Chimassorb 81 (which was manufactured by BASF Japan Ltd. and had a chemical formula name of 2-hydroxy-4-(octyloxy)-benzophenone)

Evaluation Test

Master batch pellets obtained in each of Manufacturing Examples 1 to 28 were evaluated as below. Table 1 shows results.

(1) Evaluation of the Degree of Generation of Die Drool During Pelletization

Production of a resin which adhered to a die during pelletization (die drool) was evaluated based on criteria below.
A: No die drool was produced.
B: Slight die drool was produced.
C: Die drool was produced.

(2) Evaluation of Stability of Strand During Pelletization

Stability of a strand during pelletization was evaluated based on criteria below.
A: A strand was stable.
B: A strand was not stable, with its thickness being decreased or increased.
C: A strand became soft, which caused a problem in cutting by a cutter during pelletization.
D: A strand sagged and could not be pelletized.

TABLE 1

| | Master Batch No. | EVOH (A) EVOH No. | Grade | Hindered Amine (B) HA No. | Type | Hindered Phenol (C) HP No. | Type | Mass Ratio in Master Batch (A)/(B)/(C) | Production Stability Test Strand | Die Drool |
|---|---|---|---|---|---|---|---|---|---|---|
| Manufacturing Example 1 | MB-1 | EVOH1 | H171 | A1 | Tinuvin nor 371 | B1 | Irganox 1098 | 100/0.64/8.94 | A | A |
| Manufacturing Example 2 | MB-2 | EVOH1 | H171 | A1 | Tinuvin nor 371 | B1 | Irganox 1098 | 100/1.65/13.19 | A | A |
| Manufacturing Example 3 | MB-3 | EVOH1 | H171 | A1 | Tinuvin nor 371 | B1 | Irganox 1098 | 100/3.30/11.54 | A | A |
| Manufacturing Example 4 | MB-4 | EVOH1 | H171 | A1 | Tinuvin nor 371 | B1 | Irganox 1098 | 100/5.88/11.76 | A | A |
| Manufacturing Example 5 | MB-5 | EVOH1 | H171 | A1 | Tinuvin nor 371 | B1 | Irganox 1098 | 100/11.76/5.88 | A | A |
| Manufacturing Example 6 | MB-6 | EVOH1 | H171 | A1 | Tinuvin nor 371 | B1 | Irganox 1098 | 100/13.41/2.23 | A | A |
| Manufacturing Example 7 | MB-7 | EVOH1 | H171 | A1 | Tinuvin nor 371 | B1 | Irganox 1098 | 100/19.13/1.71 | A | A |
| Manufacturing Example 8 | MB-8 | EVOH1 | H171 | A1 | Tinuvin nor 371 | B1 | Irganox 1098 | 100/14.37/7.19 | A | A |
| Manufacturing Example 9 | MB-9 | EVOH1 | H171 | A1 | Tinuvin nor 371 | B1 | Irganox 1098 | 100/19.48/9.74 | B | B |
| Manufacturing Example 10 | MB-10 | EVOH1 | H171 | A1 | Tinuvin nor 371 | B1 | Irganox 1098 | 100/15.00/5.00 | A | A |
| Manufacturing Example 11 | MB-11 | EVOH1 | H171 | A1 | Tinuvin nor 371 | B1 | Irganox 1098 | 100/19.39/4.85 | A | A |
| Manufacturing Example 12 | MB-12 | EVOH1 | H171 | A1 | Tinuvin nor 371 | B1 | Irganox 1098 | 100/10.61/9.55 | A | A |
| Manufacturing Example 13 | MB-13 | EVOH1 | H171 | A1 | Tinuvin nor 371 | B1 | Irganox 1098 | 100/9.46/11.35 | A | A |
| Manufacturing Example 14 | MB-14 | EVOH1 | H171 | A2 | Hostavin NOW | B1 | Irganox 1098 | 100/11.76/5.88 | A | A |
| Manufacturing Example 15 | MB-15 | EVOH1 | H171 | A3 | FLAMESTAB NOR 116 | B1 | Irganox 1098 | 100/11.76/5.88 | A | A |
| Manufacturing Example 16 | MB-16 | EVOH1 | H171 | A1 | Tinuvin nor 371 | B2 | Irganox1010 | 100/11.76/5.88 | A | A |
| Manufacturing Example 17 | MB-17 | EVOH2 | L171 | A1 | Tinuvin nor 371 | B1 | Irganox 1098 | 100/11.76/5.88 | A | A |
| Manufacturing Example 18 | MB-18 | EVOH3 | E171 | A1 | Tinuvin nor 371 | B1 | Irganox 1098 | 100/11.76/5.88 | A | A |
| Manufacturing Example 19 | MB-19 | EVOH1 | H171 | — | — | B1 | Irganox 1098 | 100/—/7.98 | A | A |
| Manufacturing Example 20 | MB-20 | EVOH1 | H171 | A1 | Tinuvin nor 371 | — | — | 100/7.98/— | A | A |
| Manufacturing Example 21 | MB-21 | EVOH1 | H171 | A1 | Tinuvin nor 371 | B1 | Irganox 1098 | 100/25.08/12.54 | C | C |
| Manufacturing Example 22 | MB-22 | EVOH1 | H171 | A1 | Tinuvin nor 371 | B1 | Irganox 1098 | 100/10.46/15.69 | D | — |
| Manufacturing Example 23 | MB-23 | EVOH1 | H171 | A4 | Chimassorb 2020 | B1 | Irganox 1098 | 100/11.76/5.88 | A | A |
| Manufacturing Example 24 | MB-24 | EVOH1 | H171 | A1 | Tinuvin nor 371 | B3 | Irgafos168 | 100/11.76/5.88 | A | A |
| Manufacturing Example 25 | MB-25 | EVOH1 | H171 | A1 | Tinuvin nor 371 | B4 | AO-4125 | 100/11.76/5.88 | A | A |
| Manufacturing Example 26 | MB-26 | EVOH1 | H171 | A1 | Tinuvin nor 371 | B5 | Chimassorb 81 | 100/11.76/5.88 | A | A |
| Manufacturing Example 27 | MB-27 | EVOH1 | H171 | A1 | Tinuvin nor 371 | B1 | Irganox 1098 | 100/15.48/1.03 | A | A |
| Manufacturing Example 28 | MB-28 | EVOH1 | H171 | A1 | Tinuvin nor 371 | B1 | Irganox 1098 | 100/0.65/9.78 | A | A |

Example 1

A single-layered film having a thickness of 20 μm was obtained by dry-blending 100 parts by mass of obtained master batch pellets MB-3 and 200 parts by mass of EVAL H171 and forming a film under conditions below. Table 2 shows a mass ratio ((A)/(B)/(C)) among EVOH (A), the hindered amine-based compound (B), and the hindered phenol-based compound (C) in the obtained film.

Extruder: single screw extruder (Labo Plastomill manufactured by Toyo Seiki Seisaku-sho, Ltd.), 20 mm φ

Set temperature: C1/C2/C3/D=180° C./210° C./210° C./210° C.

Examples 2 to 14 and Comparative Examples 1 to 13

Films were obtained as in Example 1 except for formulations as shown in Table 2. Table 2 shows a mass ratio ((A)/(B)/(C)) among EVOH (A), the hindered amine-based compound (B), and the hindered phenol-based compound (C) in each obtained film.

Evaluation Test

The film obtained in each of Examples 1 to 14 and Comparative Examples 1 to 13 was evaluated as below. Table 2 shows results.

(1) Evaluation of Weatherability

Weatherability of the obtained film was evaluated by immersing the film in 0.05 M of diluted sulfuric acid at room temperature for 30 minutes, thereafter removing the liquid attached to a surface of the film with Kimtowel (a product name), thereafter conducting an accelerated weathering test for 50 hours under conditions of irradiance of 1000 W/m$^2$, a black panel temperature of 63° C., and a relative humidity of 50% with the use of EYE Super UV Tester (SUV W-151 manufactured by Iwasaki Electric Co., Ltd.), and comparing fracture strength before the test, YI before and after the test, fracture elongation, and a rate of decrease in elongation before and after the accelerated weathering test. YI measurement and the tensile test were conducted by methods below.

YI Measurement

A colorimeter (NF-902 manufactured by Nippon Denshoku Industries Co., Ltd.) was employed. With YI of the film before the accelerated weathering test being denoted as $YI_0$ and YI of the film after the test being denoted as $YI_1$, $\Delta YI$ was calculated in accordance with an expression below. When $\Delta YI$ was negative, $\Delta YI$ was regarded as 0.

$$\Delta YI = YI_1 - YI_0$$

Tensile Test

The tensile test was conducted under conditions of a temperature of 23° C., a relative humidity of 50% RH, and a tension rate of 500 mm/min. with the use of an autograph (AGS-H manufactured by Shimadzu Corporation). A specimen cut into 50 mm long×15 mm wide was employed.

(2) Production of Aggregates

Aggregates like gel (equal to or greater than approximately 150 μm which could be recognized with naked eyes) in the obtained film were counted, and the count was converted to a count per 1.0 m$^2$. Determination as below was made based on the number of aggregates.

A: less than 20
B: not less than 20 and less than 40
C: not less than 40 and less than 60
D: not less than 60

TABLE 2

| | Composition Condition | | | | | | | | |
|---|---|---|---|---|---|---|---|---|---|
| | Master Batch | | EVOH (A) | | | | Hindered Amine (B) | | Hindered Phenol (C) |
| | | Parts | | | Parts | | | | |
| | MB No. | by Mass | EVOH No. | Grade | by Mass | | HA No. | Type | HP No. | Type |
| Example 1 | MB-3 | 100 | EVOH1 | H171 | 200 | A1 | TINUVIN NOR 371 | B1 | Irganox 1098 |
| Example 2 | MB-4 | 100 | EVOH1 | H171 | 915 | A1 | TINUVIN NOR 371 | B1 | Irganox 1098 |
| Example 3 | MB-5 | 100 | EVOH1 | H171 | 915 | A1 | TINUVIN NOR 371 | B1 | Irganox 1098 |
| Example 4 | MB-8 | 100 | EVOH1 | H171 | 1100 | A1 | TINUVIN NOR 371 | B1 | Irganox 1098 |
| Example 5 | MB-9 | 100 | EVOH1 | H171 | 1430 | A1 | TINUVIN NOR 371 | B1 | Irganox 1098 |
| Example 6 | MB-10 | 100 | EVOH1 | H171 | 750 | A1 | TINUVIN NOR 371 | B1 | Irganox 1098 |
| Example 7 | MB-11 | 100 | EVOH1 | H171 | 700 | A1 | TINUVIN NOR 371 | B1 | Irganox 1098 |
| Example 8 | MB-12 | 100 | EVOH1 | H171 | 800 | A1 | TINUVIN NOR 371 | B1 | Irganox 1098 |
| Example 9 | MB-13 | 100 | EVOH1 | H171 | 700 | A1 | TINUVIN NOR 371 | B1 | Irganox 1098 |
| Example 10 | MB-14 | 100 | EVOH1 | H171 | 915 | A2 | Hostavin NOW | B1 | Irganox 1098 |
| Example 11 | MB-15 | 100 | EVOH1 | H171 | 915 | A3 | FLAMESTAB NOR 116 | B1 | Irganox 1098 |
| Example 12 | MB-16 | 100 | EVOH1 | H171 | 915 | A1 | TINUVIN NOR 371 | B2 | Irganox-1010 |
| Example 13 | MB-17 | 100 | EVOH2 | H171 | 915 | A1 | TINUVIN NOR 371 | B1 | Irganox 1098 |
| Example 14 | MB-18 | 100 | EVOH3 | H171 | 915 | A1 | TINUVIN NOR 371 | B1 | Irganox 1098 |
| Comparative Example 1 | — | — | EVOH1 | H171 | — | — | — | — | — |

TABLE 2-continued

| | | | | | | | | | | |
|---|---|---|---|---|---|---|---|---|---|---|
| Comparative Example 2 | MB-19 | 100 | EVOH1 | H171 | 400 | — | — | B1 | Irganox 1098 | |
| Comparative Example 3 | MB-20 | 100 | EVOH1 | H171 | 400 | A1 | TINUVIN NOR 371 | — | — | |
| Comparative Example 4 | MB-27 | 100 | EVOH1 | H171 | 800 | A1 | TINUVIN NOR 371 | B1 | Irganox 1098 | |
| Comparative Example 5 | MB-7 | 100 | EVOH1 | H171 | 200 | A1 | TINUVIN NOR 371 | B1 | Irganox 1098 | |
| Comparative Example 6 | MB-1 | 100 | EVOH1 | H171 | 200 | A1 | TINUVIN NOR 371 | B1 | Irganox 1098 | |
| Comparative Example 7 | MB-2 | 100 | EVOH1 | H171 | 200 | A1 | TINUVIN NOR 371 | B1 | Irganox 1098 | |
| Comparative Example 8 | MB-6 | 100 | EVOH1 | H171 | 300 | A1 | TINUVIN NOR 371 | B1 | Irganox 1098 | |
| Comparative Example 9 | MB-23 | 100 | EVOH1 | H171 | 915 | A4 | Chimassorb 2020 | B1 | Irganox 1098 | |
| Comparative Example 10 | MB-24 | 100 | EVOH1 | H171 | 915 | A1 | TINUVIN NOR 371 | B3 | Irgafos-168 | |
| Comparative Example 11 | MB-25 | 100 | EVOH1 | H171 | 915 | A1 | TINUVIN NOR 371 | B4 | AO-412S | |
| Comparative Example 12 | MB-26 | 100 | EVOH1 | H171 | 915 | A1 | TINUVIN NOR 371 | B5 | Chimassorb 81 | |
| Comparative Example 13 | MB-28 | 100 | EVOH1 | H171 | 500 | A1 | TINUVIN NOR 371 | B1 | Irganox 1098 | |

| | Composition Condition Mass Ratio in Resin Composition | | | Evaluation of Film Before Weatherability Test | | | Evaluation of Film After Weatherability Test | |
|---|---|---|---|---|---|---|---|---|
| | | | | Tensile Test | | | Tensile Test | |
| | (A)/(B)/(C) | (C)/(B) | Speck | Fracture Strength (Mpa) | Fracture Elongation (%) | ΔYI | Fracture Elongation (%) | Rate of Decrease (%) |
| Example 1 | 100/1/3.5 | 3.50 | B | 58.0 | 349.66 | 0.00 | 139.89 | 60.0 |
| Example 2 | 100/0.5/1 | 2.00 | B | 68.5 | 356.75 | 0.02 | 128.71 | 63.9 |
| Example 3 | 100/1/0.5 | 0.50 | A | 70.2 | 341.65 | 0.00 | 137.71 | 59.7 |
| Example 4 | 100/1/0.5 | 0.50 | A | 74.0 | 372.63 | 0.01 | 149.01 | 60.0 |
| Example 5 | 100/1/0.5 | 0.50 | A | 81.2 | 394.20 | 0.00 | 158.58 | 59.8 |
| Example 6 | 100/1.5/0.5 | 0.33 | A | 72.6 | 367.16 | 0.00 | 159.22 | 56.6 |
| Example 7 | 100/2/0.5 | 0.25 | A | 75.9 | 381.91 | 0.77 | 179.53 | 53.0 |
| Example 8 | 100/1/0.9 | 0.90 | B | 69.0 | 379.03 | 0.00 | 152.55 | 59.8 |
| Example 9 | 100/1/1.2 | 1.20 | B | 73.8 | 357.46 | 0.01 | 142.99 | 60.0 |
| Example 10 | 100/1/0.5 | 0.50 | A | 72.0 | 360.12 | 0.00 | 126.00 | 65.0 |
| Example 11 | 100/1/0.5 | 0.50 | A | 71.5 | 355.32 | 0.00 | 113.60 | 68.0 |
| Example 12 | 100/1/0.5 | 0.50 | A | 69.5 | 344.98 | 1.51 | 141.45 | 59.0 |
| Example 13 | 100/1/0.5 | 0.50 | A | 129.0 | 286.42 | 0.00 | 115.60 | 59.6 |
| Example 14 | 100/1/0.5 | 0.50 | A | 98.0 | 371.85 | 0.00 | 149.76 | 59.7 |
| Comparative Example 1 | 100/0/0 | — | A | 98.0 | 386.24 | 0.41 | 2.00 | 99.5 |
| Comparative Example 2 | 100/0/1.5 | — | C | 69.5 | 342.31 | 0.00 | 2.20 | 99.4 |
| Comparative Example 3 | 100/1.5/0 | — | A | 71.2 | 355.32 | 3.39 | 153.94 | 56.7 |
| Comparative Example 4 | 100/1.5/0.1 | 0.07 | A | 72.1 | 360.10 | 2.64 | 156.16 | 56.6 |
| Comparative Example 5 | 100/5.6/0.5 | 0.09 | A | 70.7 | 338.69 | 8.89 | 248.05 | 26.8 |
| Comparative Example 6 | 100/0.2/2.8 | 14.00 | C | 62.8 | 337.40 | 0.00 | 114.35 | 66.1 |
| Comparative Example 7 | 100/0.5/4 | 8.00 | C | 57.6 | 300.56 | 0.00 | 108.44 | 63.9 |
| Comparative Example 8 | 100/3/0.5 | 0.17 | A | 68.4 | 350.74 | 3.02 | 190.43 | 45.7 |
| Comparative Example 9 | 100/1/0.5 | 0.50 | A | 71.2 | 354.87 | 0.00 | 100.00 | 71.8 |
| Comparative Example 10 | 100/1/0.5 | 0.50 | A | 70.1 | 348.34 | 2.76 | 135.23 | 61.2 |
| Comparative Example 11 | 100/1/0.5 | 0.50 | A | 69.8 | 342.28 | 2.86 | 128.85 | 62.4 |
| Comparative Example 12 | 100/1/0.5 | 0.50 | A | 71.1 | 351.85 | 2.26 | 132.82 | 62.3 |
| Comparative Example 13 | 100/0.1/1.5 | 15.00 | C | 70.0 | 345.22 | 0.00 | 2.00 | 99.4 |

It can be seen from Comparative Examples 1 and 2 that, when the hindered amine-based compound (B) was not contained, fracture elongation after the weathering test was poorer than in Examples. It can be seen from Comparative Example 3 that, when the hindered phenol-based compound Extruder: single screw extruder (Labo Plastomill manufactured by Toyo Seiki Seisaku-sho, Ltd.), 20 mm φ

Set temperature: C1/C2/C3/D=180° C./210° C./210° C./210° C.

TABLE 3

| | Composition Condition | | | | | | Evaluation of Film Before Weatherability Test | |
|---|---|---|---|---|---|---|---|---|
| | EVOH (A) | | Hindered Amine (B) | | Hindered Phenol (C) | | Weight Ratio (phr) | | Fracture |
| | EVOH No. | GRADE | HA No. | Type | HP No. | Type | EVOH/ HA/HP | Speck | Strength (Mpa) |
| Example 5 | EVOH1 | H171 | A1 | Tinuvin nor 371 | B1 | Irganox 1098 | 100/1/0.5 | A | 81.20 |
| Example 15 | EVOH1 | H171 | A1 | Tinuvin nor 371 | B1 | Irganox 1098 | 100/1/0.5 | B | 76.45 |

| | Evaluation of Film Before Weatherability Test | | | | Evaluation of Film After Weatherability Test | | | |
|---|---|---|---|---|---|---|---|---|
| | Tensile Test | | | | | Tensile Test | | |
| | SD | Fracture Elongation (%) | SD | ΔYI | YI Evaluation | Fracture Elongation (%) | Rate of Decrease (%) | Evaluation |
| Example 5 | 3.08 | 395.20 | 7.85 | 0.00 | A | 158.58 | 59.9 | A |
| Example 15 | 10.25 | 380.20 | 25.40 | 0.00 | A | 150.20 | 60.5 | A |

(C) was not contained, ΔYI after the weathering test was poorer than in Examples. It can be seen from Comparative Examples 4 to 8 and 13 that, when an amount of addition of (B) or (C)/(B) was out of the scope of the present invention, deterioration of ΔYI, production of aggregates, or deterioration of fracture elongation as compared with Examples was observed. It can be seen from Comparative Example 9 that, when a hindered amine-based compound other than the hindered amine-based compound (B) was employed, fracture elongation after the weathering test was poorer than in Examples. It can be seen from Comparative Examples 10 to 12 that, when a hindered phenol-based compound other than the hindered phenol-based compound (C) was employed, ΔYI was poorer than in Examples.

Example 15

A single-layered film having a thickness of 20 μm was obtained by dry-blending 100 parts by mass of an ethylene-vinyl alcohol copolymer (EVAL H171 (which was an ethylene-vinyl alcohol copolymer manufactured by Kuraray Co., Ltd. and had an ethylene unit content of 38 mol %, a melting point of 172° C., MFR (210° C., 2160 g load) of 3.4 g/10 minutes, and a degree of saponification of 99.8 mol % or higher)), 1.0 part by mass of TINUVIN NOR 371 having an N-alkoxy-2,2,6,6-tetraalkylpiperidine structure (which was a hindered amine-based compound manufactured by BASF Japan Ltd), and 0.5 part by mass of N,N'-(hexane-1, 6-diyl)bis[3-(3,5-di-tert-butyl-4-hydroxyphenyl)propionamide] (which was Irganox 1098 manufactured by BASF Japan Ltd.) and thereafter forming a film under conditions below. In a tensile test before the weathering test of the obtained film, an evaluation test as in Examples 1 to 14 was conducted to measure an SD value (a standard deviation). Table 3 shows results in comparison to Examples 5 in which an SD value was similarly measured. An SD value closer to 0 is preferred because variation in manufacturing stability and weatherability among products is less.

It can be seen that Example 5 which had gone through a master batch was lower in SD value and less in variation among products than Example 15 which had not gone through a master batch.

It should be understood that the embodiment and the examples disclosed herein are illustrative and non-restrictive in every respect. The scope of the present invention is defined by the terms of the claims rather than the description above and is intended to include any modifications within the scope and meaning equivalent to the terms of the claims.

The invention claimed is:

1. A resin composition comprising:
   an ethylene-vinyl alcohol copolymer (A) in which an ethylene unit content is from 10 to 60 mol %;
   a hindered amine-based compound (B) having a 2,2,6,6-tetraalkylpiperidine ring structure and having an alkoxy group bonded to a nitrogen atom in the structure; and
   a hindered phenol-based compound (C) having an ester bond or an amide bond,
   wherein the resin composition comprises from 0.1 to 5 parts by mass of the hindered amine-based compound (B) and from 0.2 to 5 parts by mass of the hindered phenol-based compound (C), based on 100 parts by mass of the ethylene-vinyl alcohol copolymer (A), and
   a mass ratio of the hindered phenol-based compound (C) to the hindered amine-based compound (B), (C)/(B), is from 0.2 to 3.6.

2. The resin composition according to claim 1, wherein the hindered amine-based compound (B) has a molecular weight of at least 1000.

3. The resin composition according to claim 1, wherein the hindered phenol-based compound (C) has an amide bond.

4. An agricultural film comprising a gas barrier layer composed of the resin composition of claim 1.

5. The agricultural film according to claim 4, wherein the film is a soil fumigation film, a silage film, or a greenhouse film.

6. A grain storage bag comprising a gas barrier layer composed of the resin composition of claim 1.

7. A geomembrane comprising a gas barrier layer composed of the resin composition of claim 1.

8. A pipe comprising a gas barrier layer composed of the resin composition of claim 1.

9. The pipe according to claim 8, wherein the pipe is a hot water circulation pipe or a fuel pipe.

10. A master batch comprising:
   an ethylene-vinyl alcohol copolymer (A) in which an ethylene unit content is from 10 to 60 mol %;
   a hindered amine-based compound (B) having a 2,2,6,6-tetraalkylpiperidine ring structure and having an alkoxy group bonded to a nitrogen atom in the structure; and
   a hindered phenol-based compound (C) having an ester bond or an amide bond,
   wherein the master batch comprises from 2 to 20 parts by mass of the hindered amine-based compound (B) and from 1 to 14 parts by mass of the hindered phenol-based compound (C), based on 100 parts by mass of the ethylene-vinyl alcohol copolymer (A), and
   a mass ratio of the hindered phenol-based compound (C) to the hindered amine-based compounds (B), (C)/(B), is from 0.2 to 3.6.

11. A method of manufacturing a resin composition, the method comprising:
   obtaining a master batch in advance by melting and kneading 100 parts by mass of an ethylene-vinyl alcohol copolymer (A) in which an ethylene unit content is from 10 to 60 mol %, from 2 to 20 parts by mass of a hindered amine-based compound (B) having a 2,2,6,6-tetraalkylpiperidine ring structure and having an alkoxy group bonded to a nitrogen atom in the structure, and from 1 to 14 parts by mass of a hindered phenol-based compound (C) having an ester bond or an amide bond; and
   melting and kneading the obtained master batch and additional ethylene-vinyl alcohol copolymer (A),
   wherein a mass ratio of the hindered phenol-based compound (C) to the hindered amine-based compound (B), (C)/(B), is from 0.2 to 3.6.

12. The resin composition according to claim 1, wherein the mass ratio of (C)/(B) is from 0.3 to 1.1.

13. The resin composition according to claim 1, wherein resins contained in the resin composition consist essentially of the ethylene vinyl alcohol copolymer (A).

\* \* \* \* \*